United States Patent [19]

McDonogh et al.

[11] Patent Number: 4,770,808

[45] Date of Patent: Sep. 13, 1988

[54] STABILIZATION OF METAL-CONTAINING HYDROGEN PEROXIDE SOLUTIONS

[75] Inventors: Colin F. McDonogh, Beachwood West Runcorn; David B. Mobbs, Handforth, both of England

[73] Assignee: Interox Chemicals Limited, London, England

[21] Appl. No.: 899,895

[22] Filed: Aug. 25, 1986

[30] Foreign Application Priority Data

Sep. 5, 1985 [GB] United Kingdom ............... 8522046

[51] Int. Cl.$^4$ ................. C01B 15/037; C23G 1/02
[52] U.S. Cl. ........................... 252/186.29; 252/186.28; 134/3; 423/272; 423/273
[58] Field of Search ................ 252/186.28, 186.29, 252/79.4; 134/3; 423/273, 272

[56] References Cited

U.S. PATENT DOCUMENTS

| | | | |
|---|---|---|---|
| 3,480,557 | 11/1969 | Shiraeff | 252/186.29 |
| 3,537,895 | 11/1970 | Lancy | 134/3 |
| 3,556,883 | 1/1971 | Naito et al. | 252/79.4 |
| 3,649,194 | 3/1972 | Glanville | 252/186.28 X |
| 3,756,957 | 9/1973 | Shiga | 252/79.4 |
| 3,801,512 | 4/1974 | Solenberger | 252/186.29 |
| 3,869,401 | 3/1975 | Ernst | 252/186.29 |
| 4,059,678 | 11/1977 | Winkley | 423/273 |
| 4,636,368 | 1/1987 | Pralus | 423/273 X |

*Primary Examiner*—John F. Terapane
*Assistant Examiner*—Virginia B. Caress
*Attorney, Agent, or Firm*—Larson and Taylor

[57] ABSTRACT

Unless aqueous acidic hydrogen peroxide solutions are stabilized, an excessive rate of decomposition of hydrogen peroxide precludes their use for treatment of metal surfaces, such as of copper and copper alloys, during which use substantial concentrations of decomposition catalysts build-up in solution. Regular monitoring of the solutions for residual stabilizer content would demand sophisticated analytical equipment beyond the reach of many users.

The invention provides a stabilizer in the form of a block of sparingly soluble material, whereby monitoring can be simply and readily effected visually or by a simple electrical or mechanical detection system. For copper/copper alloys preferred stabilizers are p-hydroxybenzoic acid and triphenyl carbinol.

15 Claims, No Drawings

STABILIZATION OF METAL-CONTAINING HYDROGEN PEROXIDE SOLUTIONS

The present invention relates to the stabilisation of aqueous acidic peroxidic solutions for metal treatment and processes for metal treatment using such solutions.

Metals, such as iron or especially copper and alloys based on copper can be surface treated using aqueous solutions of hydrogen peroxide and various mineral acids. During the course of such treatments, the concentration in solution of the treated metal such as copper and other constituents in the alloys increases to very significant levels which in turn accelerate the rate of decomposition of hydrogen peroxide which would render the metal treatment uneconomic. In order to reduce such hydrogen peroxide losses many different stabilisers have been proposed. These stabilisers have included organic acids or alcohols as in U.S. Pat. No. 3,537,895 (L. E. Lancy), aromatic alcohols or unsaturated aliphatic alcohols as in U.S. Pat. No. 3,869,401 (R. E. Ernst), saturated alcohols as in U.S. Pat. No. 3,556,883 (A. Naito et al), amines, amides or imines as in U.S. Pat. No. 3,756,957 (S. Shiga) and aryl sulphonic or sulphamic acids or related compounds as in U.S. Pat. No. 3,801,512.

Many of the stabilisers have been successful at reducing losses of hydrogen peroxide, to a greater or lesser extent. However, they are organic compounds and therefore suffer to some extent from oxidation in situ by the hydrogen peroxide. Moreover, there is a certain degree of removal of solution adhering to the metal work-piece. The hydrogen peroxide concentration is periodically topped up with fresh solution, to replace decomposition losses and reagent usage. Accordingly, after the acidic hydrogen peroxide bath has been in use for several hours there is a growing uncertainty as to the residual concentration of organic stabiliser. The problem is compounded by the fact that many of the companies that would employ such solutions to surface-treat metals are relatively small and could not afford sophisticated analytical equipment for low concentrations of organic compound, nor the effort needed to regularly sample and analyse, or to train their staff to carry out such tasks. At present, many such users rely upon their skill and experience to guess when to add more stabiliser to the bath and how much to add.

It is an object of the instant invention to provide a system for stabilising aqueous acidic hydrogen peroxide that can be used after minimal instruction by unskilled chemical operators, and a further object to provide a self-regulatory mechanism for the addition of stabiliser such that neither build-up nor run-down of stabiliser concentration occurs unchecked.

According to the present invention there is provided a process for stabilising aqueous acidic hydrogen peroxide solutions in the presence of catalytic metal ions characterised by maintaining the solution in contact with a block of a solid stabiliser for hydrogen peroxide that is scarcely soluble in the acidic solution, whereby a saturated solution of stabiliser is obtained and maintained by slow dissolution to offset losses. Such losses are often caused by in situ oxidation, drag-out or other reagent replacement and the presence of the block ensures that the critical stabiliser concentration is always achieved.

The term "block" herein is used in its conventional dictionary meaning, indicating a coherent significant mass of material, a lump dimensionally much greater than a granule, the presence or absence of which is readily observable by the human eye.

According to a second aspect of the present invention there is provided a process for treating a metal surface in a bath of an aqueous acidic solution of hydrogen peroxide in which the hydrogen peroxide is stabilised against decomposition by incorporating stabiliser in the bath.

In the course of the stabilising solution being used over an extended period of time the block slowly dissolves, maintaining in a simple fashion a substantially constant concentration of stabiliser therein, normally at or near the saturation concentration of that stabiliser. Advantageously, because the block is easily seen, its presence or absence can be detected by relatively unskilled operatives so that the guesswork of leaving enough stabiliser in solution is circumvented without the installation of sophisticated and expensive equipment and avoids extensive operator training. Clearly, when one block is virtually used up, it is simple to introduce a further block. Whilst visual inspection represents one method of determining when a further block should advantageously be added, various aids can be employed, taking advantage of the change in dimensions of the block as it dissolves. By way of example, shrinkage of the block can enable its upper or lower surface to move or be moved relative to the bath, with the result that an electrical circuit to be made or broken thereby triggering an audible or visual warning such as could happen when a block floated to a different level or is pressed down onto a fixed housing as it dissolved. In an alternative mechanical system a restrained or restraining lever or pulley can be released or moved when the block dissolves. Many variations or alternatives can spring to the mind of the skilled artisan.

By employing a stabiliser that is only sparingly soluble in the solution, the system enables sufficient stabiliser to be present over long periods of time without constant vigilance on the part of the operator. A periodic and infrequent check suffices. It is desirable to employ stabilisers having only sparing solubility in aqueous acidic solutions most conveniently at from 1 to 5 parts stabiliser per 1000 parts w/w of solution, but up to 20 parts per 1000 parts w/w may be tolerated. The choice of stabiliser depends upon which metal is being treated, as well as the solubility characteristics. In some embodiments, the present invention is directed specifically to the treatment of copper or copper alloys. Within this category can be found in particular para hydroxybenzoic acid and triphenyl carbinol, or mixtures thereof. It will be understood that the stabilisers can be used by themselves or in conjunction with one or more soluble stabilisers present in hydrogen peroxide solutions to maintain stability during transportation and storage, such as sodium stannate and sodium pyrophosphate, typically in amounts of each up to 300 ppm in the concentrated hydrogen peroxide.

In addition to the stabiliser, the acidic solution may also contain one or more corrosion inhibitors such as benzotriazole, phenyl hydrazine or thiourea, preferably at a concentration of at least 0.05% w/w, more preferably in at least 0.1% w/w and especially at 0.2% or more, such as 0.2 to 0.5% w/w. The corrosion inhibitors can be added separately into the solution at least partly added together with the stabiliser in the same or a separate block.

A further component that can be added into solution is a wetting agent. Suitable wetting agents comprise anionic surfactants, including in particular alkyl benzene sulphonates, or nonionic surfactants including fatty alcohol or alkyl phenol condensates with polyethylene glycols, typically at a concentration of up to 0.15% w/w in solution. It will be recognised that where solid wetting agents are chosen, such as sodium dodecyl benzene sulphonate, they can be incorporated to at least some extent in the stabiliser block and/or introduced separately. Although the solubility of these minor components may be greater than that of the major component of the block, due to the homogenity of the block these minor components are also released at a controlled rate.

The maximum size and shape of the blocks are at the discretion of the user. It is often convenient to use blocks weighing at the outset about 1 kg or heavier, such as 1 to 5 kg since these can be readily handled, held in the pickling/polishing bath and have a long life in typically sized baths. Smaller blocks, for example tablets of 200 to 500 g can also be used, if desired and especially if they are stacked, in use, such as in a verticle tube or housing presenting a contact surface with the solution in the bath and an opening above the bath into which further tablets can be introduced. For the larger blocks, when used singly one appropriate shape is a cylinder or bar which is held vertically and can rest partly within and partly above the liquor in the bath. It will be recognised the foregoing types of block render themselves amenable to visual, mechanical or electrical sensing as to whether they are present or absent.

Alternative shapes, especially where it is intended to employ a plurality of blocks, include cubes, or short sections of rod or bar, which can present mating surfaces such as conical or domelike top and bottom, the one indented and the other protruding. The blocks can be made by fusing granules of the stabiliser and any other component homogeneously mixed therewith either by melting or by the application of pressure or both. Melts can be poured into moulds or extruded as bars or rods. Granular or powdery mixtures can be pressure tabletted.

The aqueous acidic solution can be obtained from any mineral acid, and normally sulphuric, phosphoric and/or nitric acids, of which sulphuric acid is most common. The mineral acid can be present at a concentration of up to 20%, by volume, the actual concentration being selected in conjunction with the intended use of the solution. For pickling, the concentration is normally 5 to 15% mineral acid and especially from 8 to 12%, whereas for polishing more dilute solutions of at least 0.2 to 2.5% and particularly 0.5 to 1.5% concentration of mineral acid are used.

The concentration of hydrogen peroxide is usually at least 2% by volume, and of normally up to 10% by volume in many instances being from 3 to 7% by volume for either pickling or polishing applications.

The processes using the stabilised hydrogen peroxide are normally conducted at ambient up to sub-boiling temperature. The actual temperature of 50°–70° C. enables faster pickling or polishing but tends to use hydrogen peroxide slightly less efficiently, whereas the converse is true at the lower temperature of 20° to 50° C.

The stabilised acidic hydrogen peroxide liquors are intended for pickling and polishing copper and alloys thereof, that is to say alloys in which the major metal is copper. Other significant components of such alloys includes especially zinc and also nickle and tin. Suitable alloys for metal treatment herein include, therefore, brass, german silver and bronze.

Having described the invention in general terms, specific embodiments will now be given by way of example only.

A block of stabiliser on a laboratory demonstration scale was prepared by melting p-hydroxybenzoic acid (10 g) by heating to 230° C. and pouring it into a breakable glass cylindrical mould. The mass was then cooled and the mould broken to reveal the block. The solubility of the block was tested by partially immersing the block in a bath of pickle liquor (100 ml) containing sulphuric acid (180 gl$^{-1}$) and hydrogen peroxide (80gl$^{-1}$), at ambient temperature of about 20°–22° C. The bath was stirred, and samples of the liquor were taken periodically and analysed. A saturation concentration of 0.2% w/w (approx) of p-hydroxybenzoic acid was reached ater 15 minutes and maintained thereafter.

In order to assess the effectiveness of the block at stabilising hydrogen peroxide, a similarly made block was suspended at ambient temperature in a contaminated pickle liquor, 25 liters, containing sulphuric acid (180 gl$^{-1}$) hydrogen peroxide 65 gl$^{-1}$) cupric ion (18 gl$^{-1}$) and zinc ion (12 gl$^{-1}$), the latter ions being added as the respective sulphates. A bundle of brass tubes (1.35 kg) was immersed periodically to test whether the solution was still capable of pickling, in each test the immersion lasting 10 minutes. Samples of the liquor were also taken during the trial at the times specified below in Table 1 and analysed for $H_2O_2$ content. By way of comparison, a similar pickling liquor without stabiliser at ambient temperature contained virtually no detectable hydrogen peroxide after 72 hours.

TABLE 1

| Trial Duration (hours) | Residual $H_2O_2$ (% w/w) | Proportions of $H_2O_2$ remaining (%) | Comments |
|---|---|---|---|
| 0 | 5.10 | 100 | |
| 72 | 5.06 | 99.2 | |
| 312 | 4.92 | 96.5 | Rods pickled |
| 360 | 4.70 | 92.2 | Rods pickled |
| 552 | 4.69 | 92.0 | Rods pickled |

The results in Table 1 demonstrate that the block of stabiliser enabled most of the hydrogen peroxide to be retained even after 23 days storage in contact with 18 gl$^{-1}$ cupric ion, a notorious decomposition catalyst for hydrogen peroxide.

The practical effect of including a corrosion inhibitor in the solution together with the block stabiliser, was demonstrated by pickling samples of a brass fitting for 5 minutes in solutions containing 10% v/v sulphuric acid, 5% v/v hydrogen peroxide and a block of p-hydroxybenzoic acid at 25° C. The solutions also contained a varied concentration of benzotriazole as the corrosion inhibitor. The surface finish of the fittings was then assessed by eye, and summarised in Table 2 below.

TABLE 2

| Concentration (% w/w) of benzotriazole | Surface appearance |
|---|---|
| 0 | Dullish brown |
| 0.02 | Dullish yellow-brown |
| 0.05 | Silky brown-yellow |
| 0.1 | Slightly polished gold |
| 0.25 | Bright yellow gold |

TABLE 2-continued

| Concentration (% w/w) of benzotriazole | Surface appearance |
|---|---|
| 0.5 | Deep yellow |

From Table 2 it can be seen that as the concentration of benzotriazole increases, the dezincification of the brass fitting decreases, a good result being obtained at 0.1% concentration upwards.

We claim:

1. In a process for stabilising aqueous acidic hydrogen peroxide solutions in the presence of catalytic metal ions the improvement consisting essentially of maintaining the solution in contact with a block of a solid stabiliser for hydrogen peroxide that is sparingly soluble in the acidic solution, whereby a saturated solution of stabiliser is obtained and maintained by slow dissolution to offset losses.

2. A process according to claim 1 in which the block is replaced or a further block added when inspection or the triggering of an alarm on dissolution of the block indicates that the first block requires augmentation.

3. A process according to claim 1 or 2 in which the stabiliser has a solubility of 1 to 20 parts per 1000 parts by weight of aqueous acidic hydrogen peroxide solution.

4. A process according to claim 1 in which the stabiliser is selected from p-hydroxbenzoic acid and triphenyl carbinol and mixtures thereof whereby the solution is suitable for treatment of copperor copper-alloy metal surfaces.

5. A process according to claim 1 in which the stabiliser is employed in conjunction with a corrosion inhibitor and/or a wetting agent.

6. A process according to claim 5 in which at least part of the corrosion inhibitor and/or wetting agent is incorporated and dispersed in the block of stabiliser.

7. A process according to claim 5 or 6 in which benzotriazole, phenyl hydrazine or thiourea is employed as corrosion inhibitor and/or an alkyl benzene sulphonate as wetting agent.

8. A process according to claim 1 in which the block is formed by molding molten material or compression moulding a powder or granular mass.

9. A process according to claim 1 wherein said catalytic metal ions result from contacting a metal surface with said aqueous acidic hydrogen peroxide.

10. A process according to claim 9 which employs a stabiliser selected from p-hydroxbenzoic acid and triphenyl carbinol and mixtures thereof.

11. A process according to claim 9 in which the solution has a temperature of 20° to 70° C.

12. A process according to claim 9 in which the bath contains 2 to 10% by volume hydrogen peroxide (as 100%).

13. A process according to claim 9 in which the bath contains sulphuric acid at a concentration of 5 to 15% by volume for metal pickling or 0.2 to 2.5% by volume for metal polishing.

14. A process according to claim 9 in which the block contains p-hydroxbenzoic acid or triphenyl carbinol or mixtures thereof as stabiliser, and optionally benzotriazole, phenyl hydrazine or thiourea as corrosion inhibitor and/or an alkyl benzene sulphonate as wetting agent, the aqueous acidic hydrogen peroxide solution contains 2 to 10% by volume hydrogen peroxide (as 100%) and sulphuric acid at a concentration of 5 to 15% by volume for metal pickling or 0.2 to 2.5% by volume for metal polishing which is conducted at a temperature of 20° to 70° C.

15. A process according to claim 14 in which the metal being treated comprises copper or an alloy thereof.

* * * * *